(12) United States Patent
Imberti et al.

(10) Patent No.: US 7,794,105 B2
(45) Date of Patent: Sep. 14, 2010

(54) TEMPERATURE CONTROLLED LIGHT FIXTURE FOR ENVIRONMENTAL CHAMBER

(75) Inventors: Henry Javier Imberti, Boone, IA (US); Daniel Gene Kiekhaefer, Ankeny, IA (US); Kurt Lee Wilhelm, Ankeny, IA (US)

(73) Assignee: Percival Scientific, Inc., Perry, IA (US)

( * ) Notice: Subject to any disclaimer, the term of this patent is extended or adjusted under 35 U.S.C. 154(b) by 892 days.

(21) Appl. No.: 11/621,412

(22) Filed: Jan. 9, 2007

(65) Prior Publication Data

US 2008/0164824 A1    Jul. 10, 2008

(51) Int. Cl.
*F21V 29/00*    (2006.01)
(52) U.S. Cl. ............... 362/218; 362/219; 362/294; 315/112; 315/117; 47/17
(58) Field of Classification Search ........... 315/112, 315/117, 118, 119, 151, 159, 363; 47/58.1 LS, 47/17, 57.6, 57.5, 89; 362/294, 147, 148, 362/218, 219, 217.01, 219.09
See application file for complete search history.

(56) References Cited

U.S. PATENT DOCUMENTS

| | | | | |
|---|---|---|---|---|
| 3,604,500 | A | * | 9/1971 | Davis ......................... 315/17 |
| 3,870,873 | A | | 3/1975 | Mallory |
| 4,068,405 | A | * | 1/1978 | Campbell et al. .............. 47/65 |
| 4,396,872 | A | | 8/1983 | Nutter |
| 4,694,223 | A | | 9/1987 | Campolo |
| 4,922,078 | A | | 5/1990 | Ulrich |
| 5,705,897 | A | * | 1/1998 | Hanazaki et al. ............. 315/307 |
| 5,799,614 | A | * | 9/1998 | Greenwood .................. 119/452 |
| 6,126,079 | A | * | 10/2000 | Shoemaker ................... 236/35 |
| 2005/0276053 | A1 | | 12/2005 | Nortrup |
| 2006/0286841 | A1 | * | 12/2006 | Hale et al. .................... 439/236 |
| 2007/0157515 | A1 | * | 7/2007 | Bula .............................. 47/89 |

FOREIGN PATENT DOCUMENTS

EP          0312002 B1    1/1995

OTHER PUBLICATIONS

Percival Product Mini-Catalog, 2006, Percival Scientific, Inc. pp. 1-11.

* cited by examiner

*Primary Examiner*—Douglas W Owens
*Assistant Examiner*—Ephrem Alemu
(74) *Attorney, Agent, or Firm*—McKee, Voorhees & Sease, P.L.C.

(57) ABSTRACT

A light fixture includes a plurality of fluorescent bulbs wherein a light intensity of each of the plurality of fluorescent bulbs is related to the operating temperature of the fluorescent bulbs, a sensor for sensing a physical parameter related to the light intensity, and a circuit adapted for monitoring the sensor and controlling the operating temperature of the fluorescent bulbs to maintain the operating temperature of the fluorescent bulbs within a range having a lower temperature and an upper temperature. A method of maintaining light intensity of fluorescent bulbs in an environmental chamber includes monitoring a physical parameter associated with the light intensity of the fluorescent bulbs in an environmental chamber and adjusting temperature of the fluorescent bulbs in the environmental chamber to maintain an optimum light intensity of the fluorescent bulbs in the environmental chamber.

31 Claims, 9 Drawing Sheets

TEMPERATURE CONTROLLED LIGHT FIXTURE FOR ENVIRONMENTAL CHAMBER

BACKGROUND OF THE INVENTION

The present invention relates to a temperature controlled light fixture, such as, but not limited to a temperature controlled light fixture for use in environmental chambers. Environment chambers are used for various purposes including plant growth, incubation, germination and other purposes. The term "environmental chamber" is intended to include plant growth chambers, germinators, incubators, and other variations of environmental chambers, as it is to be appreciated that controlled environment chambers are used for numerous purposes. One common application for these chambers is plant growth research, where parameters such as temperature, light, and humidity (as well as other parameters such as $CO_2$) are tightly controlled. The specific combination of environmental conditions controlled may be related to the specific purpose of the environmental chamber.

Light is one of the most important parameters studied in the field of plant growth research as it is a primary component in the process of photosynthesis. In some species of plants it is critical to have very high and very stable light irradiance (typically 1000 μmoles/m$^2$/sec) throughout the entire chamber temperature operating range (typically about 4° C. to 45° C.).

Fluorescent lamps tend to be the light source of choice for plant growth researchers as they are inexpensive, and very common. The drawback to fluorescent lighting is that the technology is suited for a wider application base such as residential and commercial lighting, where the performance requirements are not as stringent as those for plant growth. Thus, it appears that fluorescent lamp and ballast manufacturers have little incentive to improve their lamps to meet the specific needs of plant growth research. Thus, problems remain with fluorescent lighting for use in environmental chambers.

One such problem is that fluorescent bulbs are sensitive to the temperature of the ambient environment in which they are operating. This is due to the primary application for which they are designed (residential settings tend not to have large temperature changes). Typically there is an optimal ambient temperature at which a bulb operates at peak efficiency (i.e. Lumens/Watt—or Light Intensity per Energy Consumption). The optimal bulb temperatures are specific to bulb-type. As ambient temperatures move away from this optimal point (either higher or lower) the lamps become less efficient. For each bulb type, manufacturers supply Temperature vs. Intensity curves.

Researchers rely on consistent and predictable conditions within controlled environments, and currently no one in the industry has developed a solution which optimizes lamp efficiency, and provides stable lamp outputs over a wide range of temperatures (the typical temperature range for a lighted environment is approximately 4° C. to 45° C.).

Up to this point, light fixtures have been developed (often with complete refrigeration systems) with controls which remove excess heat inside the fixture. The purpose of these systems was to remove the heat from the lamps as such heat negatively affects temperature within the environmental chamber. It should also be noted that the improvements to fluorescent light fixtures as discussed below are not just significant to the plant growth research industry. Other applications of this technology can benefit from the improvements provided by the present invention.

BRIEF SUMMARY OF THE INVENTION

Therefore, it is a primary object, feature or advantage of the present invention to improve over the state of the art.

It is a further object, feature, or advantage of the present invention to monitor and control the light intensity of fluorescent lamps to maintain light intensity at or near optimum conditions in environmental chambers.

It is a still further object, feature, or advantage of the present invention to manage or control heating and cooling of fluorescent lamps in order to control the light intensity of the fluorescent lamps.

Yet another object, feature, or advantage of the present invention is to provide for the use of temperature sensitive fluorescent lamps, such as, but not limited to T5 lamps in environmental chambers.

A further object, feature, or advantage of the present invention is to provide for stable light intensity from fluorescent lamps regardless of ambient temperature conditions in an environmental chamber.

A still further object, feature, or advantage of the present invention is the ability to use heat produced naturally by lamps and ballasts to serve as a heat source for maintaining the required optimal temperature inside the light fixture so as to use previously unwanted heat to produce a positive on lighting and energy consumption characteristics of the light fixture.

Another object, feature or advantage of the present invention is to increase efficiency of environmental chambers which require high light levels at low ambient temperatures such that additional fluorescent lamps do not necessarily need to be added to light fixtures to compensate for the loss in efficiency at low ambient temperatures.

Yet another object, feature, or advantage of the present invention is to increase efficiency of an environmental chamber by using less current to power ballasts and bulbs.

A further object, feature, or advantage of the present invention is to increase efficiency of an environmental chamber by placing less stress on the refrigeration system.

A still further object, feature, or advantage of the present invention is to provide a light fixture which also aids in the performance of dimmable lighting, by providing more stability in terms of quality (such as less flickering) at settings near the lower end of the dimming range.

Another object, feature, or advantage of the present invention is to provide a light fixture for use in an environmental chamber which does not require a refrigeration system to control the temperature within the light fixture.

One or more of these and/or other objects, features, or advantages of the present invention will become apparent from the specification and claims that follow.

According to one aspect of the present invention a light fixture includes a plurality of fluorescent bulbs wherein a light intensity of each of the plurality of fluorescent bulbs is related to operating temperature of the fluorescent bulbs, a sensor for sensing a physical parameter related to the light intensity, and a circuit adapted for monitoring the sensor and controlling the operating temperature of the fluorescent bulbs to maintain the operating temperature of the fluorescent bulbs within a range having a lower temperature and an upper temperature.

According to another aspect of the present invention, a light fixture includes a plurality of fluorescent bulbs, a temperature sensor position proximate the plurality of fluorescent bulbs, a cooling device (such as a fan) for cooling the plurality of fluorescent bulbs, and an electrical circuit connected to the temperature sensor and cooling device, wherein the electrical circuit is adapted to maintain light intensity of the fluorescent bulbs within a predetermined range of optimal light output by controlling the cooling device to control the temperature of the fluorescent bulbs and to thereby increase the temperature of the plurality of fluorescent bulbs if the temperate of the fluorescent bulbs is below the predetermined range and to decrease the temperature of the fluorescent bulbs if the temperature is above the predetermined range.

According to another aspect of the present invention an environmental chamber includes an insulated cabinet, a refrigeration system adapted for controlling the temperature within the insulated cabinet, a control system, and one or more light fixtures disposed within the insulated cabinet. Each light fixture includes a plurality of fluorescent bulbs, a sensor, and a thermal management control system electrically connected to the sensor and adapted to provide for heating and cooling of the plurality of fluorescent bulbs to maintain optimum light intensity of the fluorescent bulbs.

According to another aspect of the present invention a method of maintaining light intensity of fluorescent bulbs in an environmental chamber is provided. The method includes monitoring a physical parameter associated with the light intensity of the fluorescent bulbs inside one or more light fixtures within an environmental chamber and based on the physical parameter, adjusting the temperature of the fluorescent bulbs to maintain an optimum light intensity of the fluorescent bulbs.

According to another aspect of the present invention a method of maintaining light intensity of fluorescent bulbs in an environmental chamber includes providing an environmental chamber having an insulated cabinet, a refrigeration system adapted for controlling the temperature within the insulated cabinet, a control system, and one or more light fixtures disposed within the insulated cabinet. Each light fixture includes a plurality of fluorescent bulbs, a sensor, and a thermal management control system electrically connected to the sensor and adapted to provide for heating and cooling of the plurality of fluorescent bulbs to maintain optimum light intensity of the fluorescent bulbs. The method further includes monitoring a physical parameter associated with the light intensity of the fluorescent bulbs using the sensor, and based on the physical parameter adjusting the temperature of the fluorescent bulbs in the light fixture to maintain an optimum light intensity of the fluorescent bulbs in the environmental chamber.

DETAILED DESCRIPTION OF THE PREFERRED EMBODIMENT

The present invention relates to a light fixture and especially a light fixture for use in an environmental chamber. The light fixture is adapted to optimize light intensity (as may be measured in $\mu moles/m^2/sec$) and to provide a stable lamp output, including at ambient temperatures above and below an optimum point. Although specific embodiments are described herein, the present invention is not to be limited to the specific embodiments described.

Figure 1:
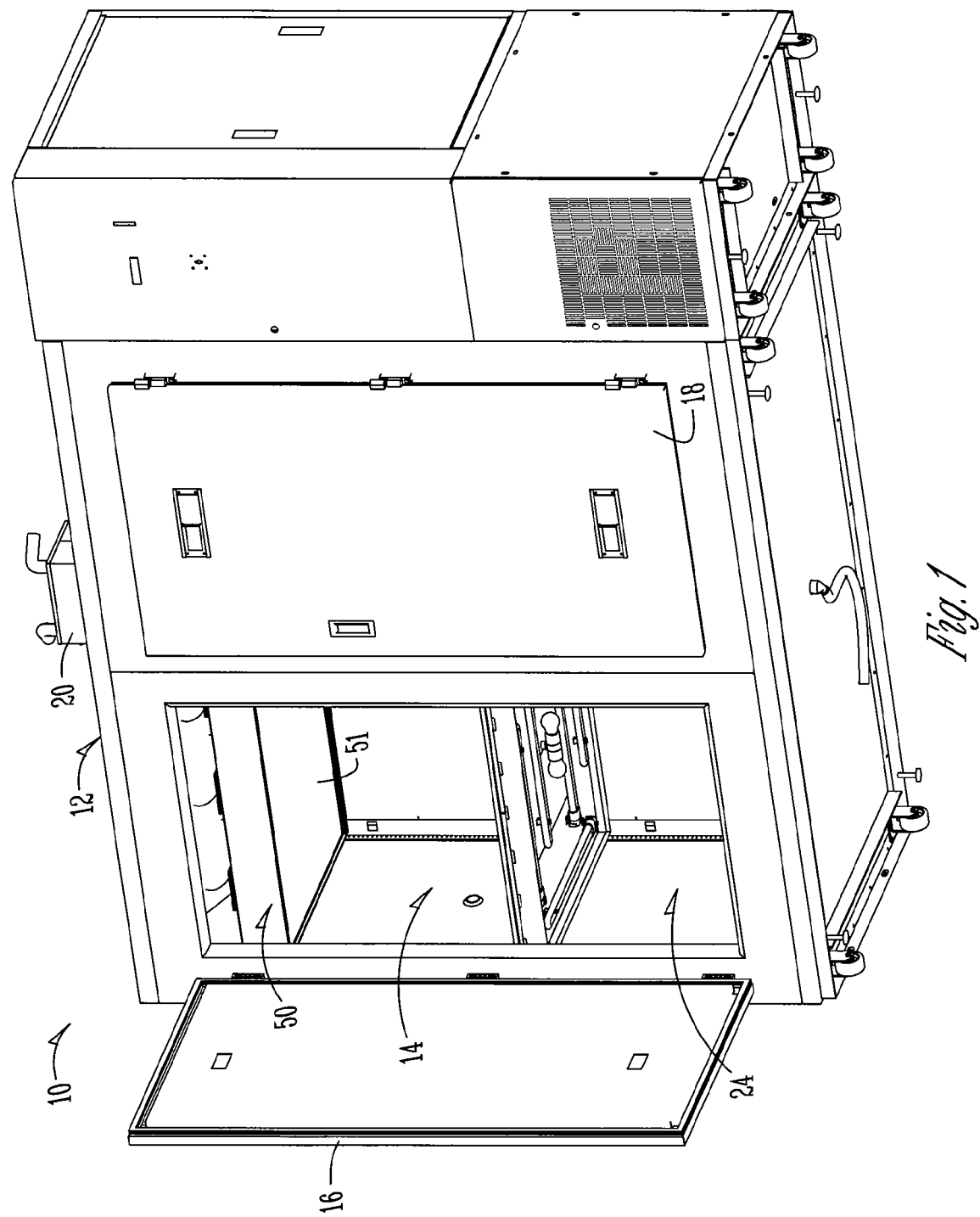
FIG. 1 is a perspective view of one embodiment of an environmental chamber with a refrigeration system of the present invention.
Figure 2:
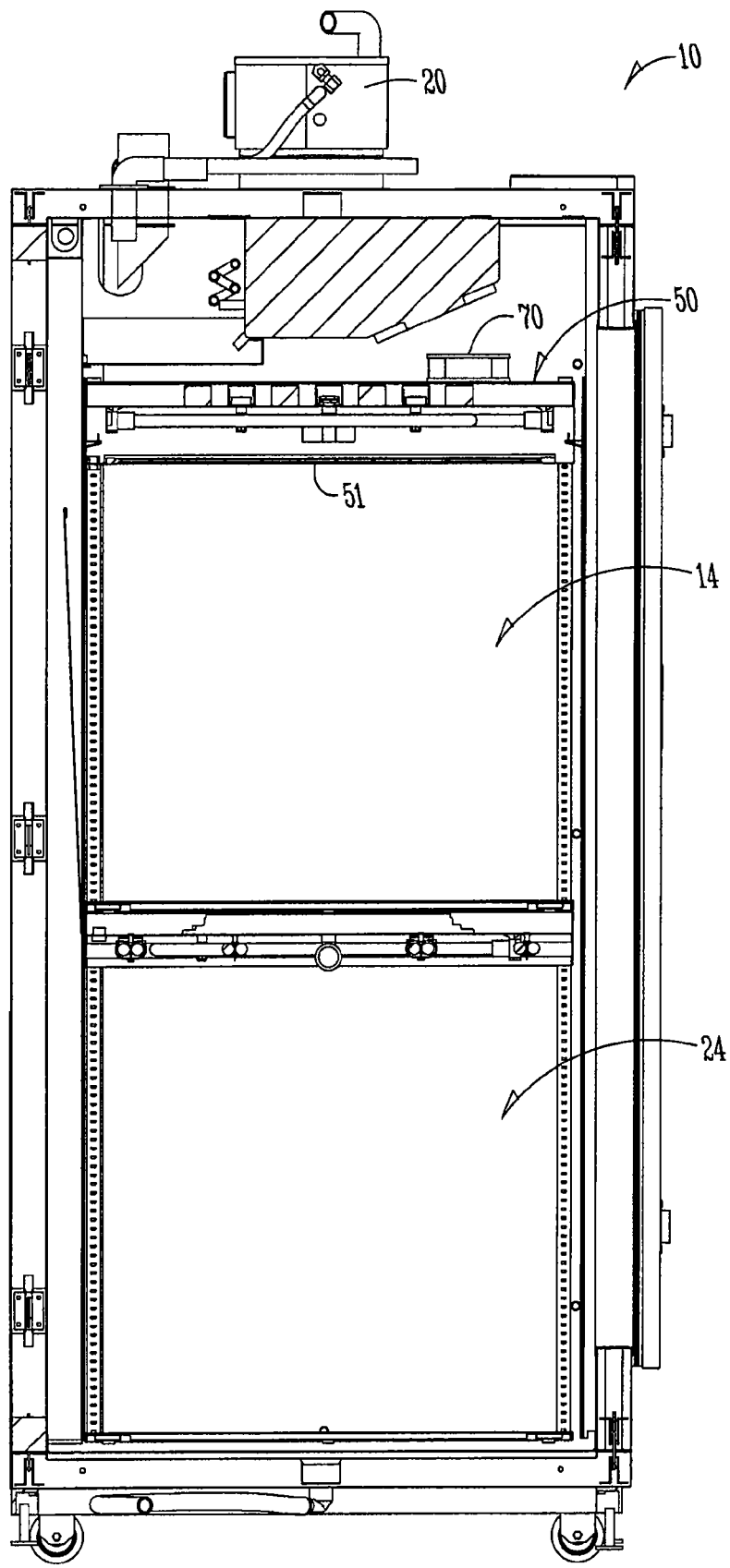
FIG. 2 is a cross sectional view of one embodiment of an environmental chamber of the present invention.

FIG. 1 illustrates one embodiment of an environmental chamber 10. The environmental chamber 10 has an insulated cabinet 12. Atop the insulated cabinet 12 is an ultrasonic humidifier 20. Within the insulated cabinet are chambers or compartments such as an upper compartment 14 and a lower compartment 24. A first door 16 provides access to compartments 14 and second door 18 provides access to additional compartments. Within the cabinet 12 is a light fixture 50. Located on top of the light fixture 50 is a thermal management system which can include one or more air circulation fans 70 (FIG. 2). At the bottom of the light fixture 50 is a thermal barrier such as a Plexiglas barrier 51.

FIG. 2 provides a cross sectional view of the environmental chamber of FIG. 1. The environmental chamber 10 shown in FIG. 1 and FIG. 2 is merely representative of numerous styles, types, varieties, sizes, and configurations of environmental chambers which provide the light fixture of the present invention.

Figure 3:
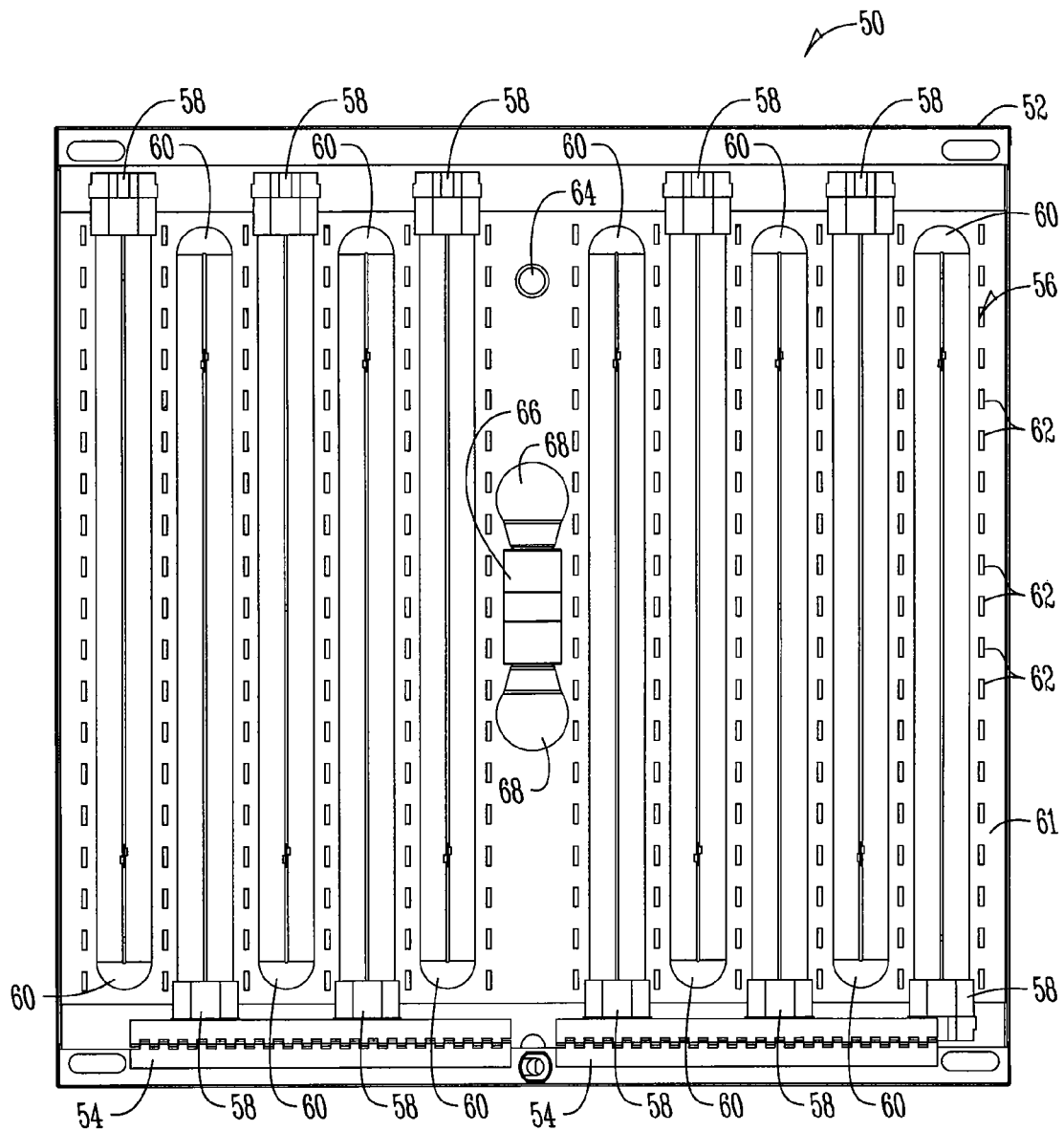
FIG. 3 is a view of one embodiment of a light fixture of the present invention.

FIG. 3 illustrates one embodiment of a light fixture 50 of the present invention. The light fixture 50 has a frame 56 with opposite ends 52, 54 and a metal sheet 61 between the opposite ends 52, 54. Slits or perforations 62 in sheet 61 are shown. In FIG. 3, a number of sockets 58 are shown with corresponding fluorescent bulbs 60. A temperature sensor 64 which may be a part of a thermostat is shown. Preferably, the temperature sensor 64 is placed away from the air inlet and in a position which allows for a representative temperature to be measured, as it will be appreciated that there may be some variance of the temperature of each fluorescent bulb 60 due to its location. A light socket 66 is also shown with incandescent bulbs 68 on opposite ends of the light socket 66. It should be appreciated that incandescent bulbs 68 are often used in environmental chambers to add more red, infrared spectrum, particularly where plants are being grown. The fluorescent bulbs shown are T5 compact fluorescent bulbs otherwise known as twin T5 bulbs. Such bulbs have significant reduction in efficiency once the ambient temperature drops below the optimum point. Of course, other types of bulbs may used such as T5 linear bulbs or different sizes of bulbs such as T8 bulbs. It should be appreciated, however, that bulbs such as T8 bulbs do not exhibit the same reduction in light output as the ambient temperature drops. Of the commercially available fluorescent bulbs, T5 fluorescents have the most significant reduction in light output once the ambient temperature drops below the optimum point. Due to the smaller size of a T5 fluorescent bulb in comparison to a normal T8 or T12 fluorescent bulb, a T5 fluorescent bulb does have some advantages. For example, a light fixture may provide for greater light intensity for a predetermined size given the small size of the florescent bulbs. It should be appreciated, however, that other sizes, types, and quantities of fluorescent bulbs may be used. T5 fluorescent bulbs also have a higher Lumens per Watt ratio than T8 or T12 fluorescent bulbs.

Figure 4:
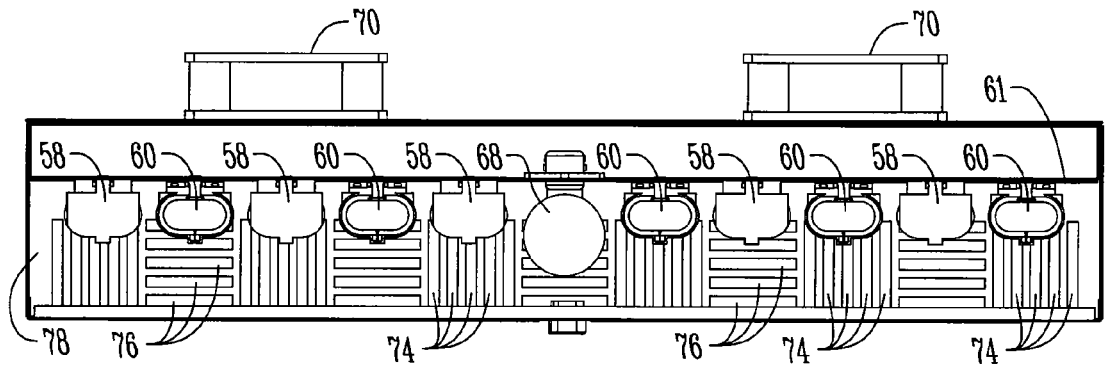
FIG. 4 is a cross section of a front view of one embodiment of a light fixture of the present invention.

FIG. 4 is a cross sectional view of one embodiment of a light fixture. Note there are vertical slots 74 and horizontal slots 76 to assist in air intake. Fans 70 are shown positioned over the slotted sheet metal plate 61, to which the lamp holders 58, fluorescent bulbs 60 and other light fixture electrical components are attached. According to one embodiment, if the temperature of the ambient air surrounding the fluorescent bulbs 60 drops below an optimal point or range, the fans 70 will de-energize. De-energizing the air circulation fans will keep the forced air exchange between the enclosed lamp space and the chamber environment to a minimum. Without a forced air exchange, the heat produced by the lamps and ballasts will no longer be removed from inside the lamp space, and will serve to heat the ambient air surrounding the fluorescent bulbs. If the temperature inside the light fixture rises above the optimal point or optimum range for maximum lamp efficiency, the air circulation fans 70 will energize, and produce a forced air exchange between the environment inside the chamber with the ambient air surrounding the bulbs inside the light fixture 50. The resulting air exchange will cool the air surrounding the fluorescent bulbs inside the light fixture 50. It should be observed that in the design shown, there will be some chamber air entering through the slots 74, 76 as air may be forced in by the environmental chamber's main air circulation fans (not shown). This small remaining air exchange will also include some convection, as the heat from the lamps 60 and ballasts will have a tendency to rise out of the axial fan holes.

Figure 5:
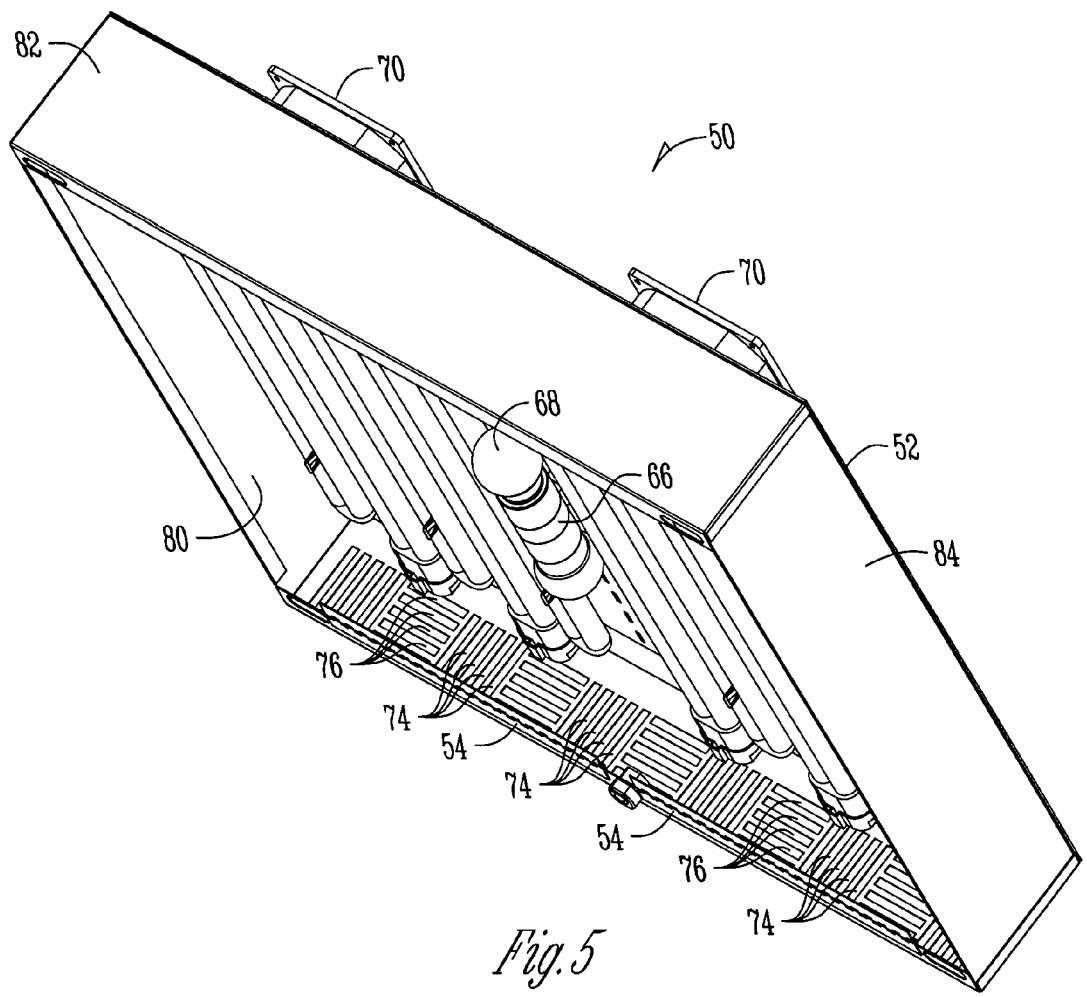
FIG. 5 is a perspective view of one embodiment of a light fixture of the present invention. The light fixture barrier is not shown.

FIG. 5 is a perspective view of one embodiment of a light fixture 50 of the present invention. The frame or housing of the light fixture includes opposite sides 80, 84 and front side 82. The inside of the frame or housing of the light fixture 50 may be a uniform white surface or clad with spectral aluminum to further enhance light irradiance of the fluorescent lamps.

Figure 6:
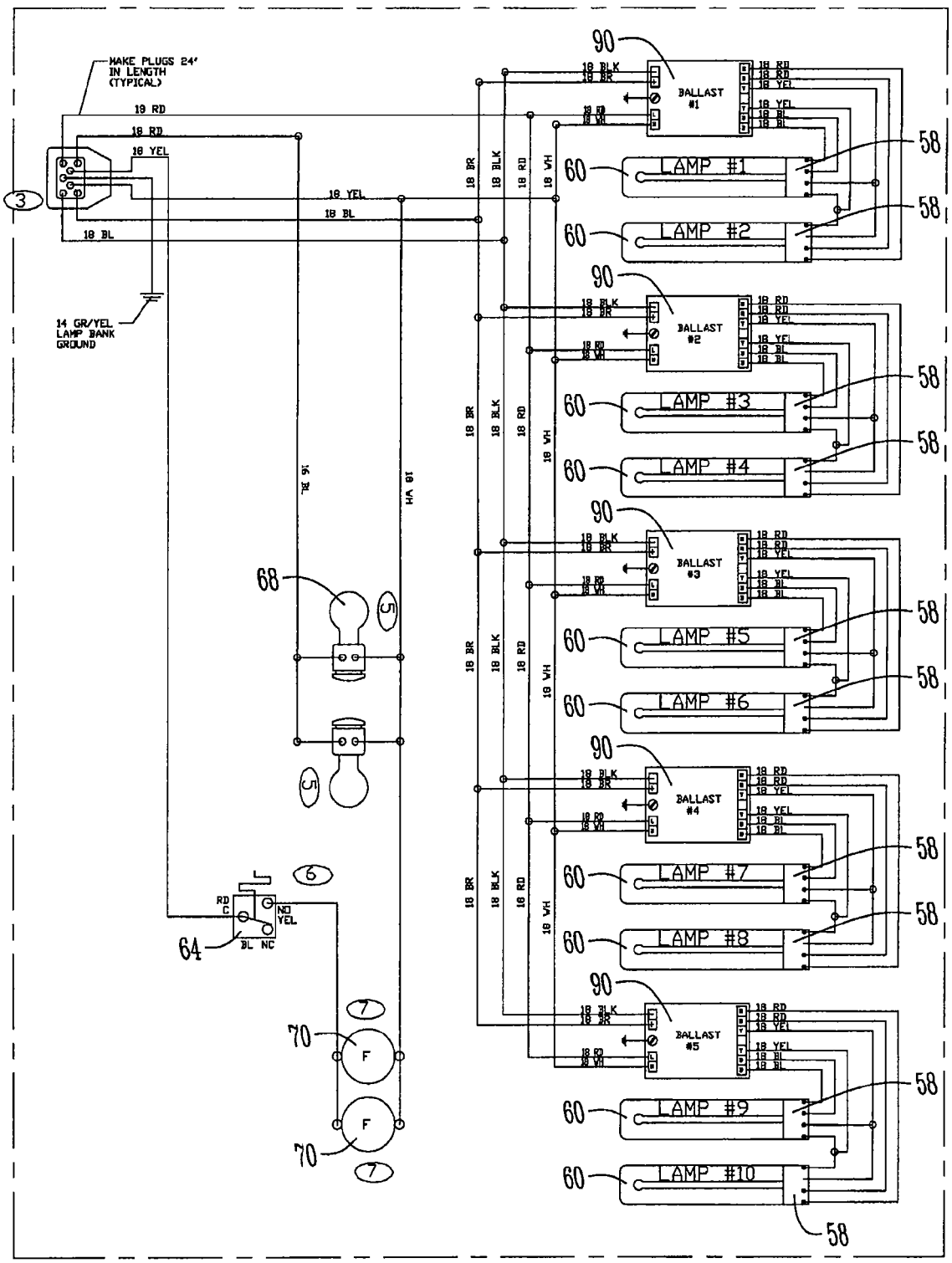
FIG. 6 is an electrical schematic for one embodiment of a light fixture of the present invention.
Figure 9:
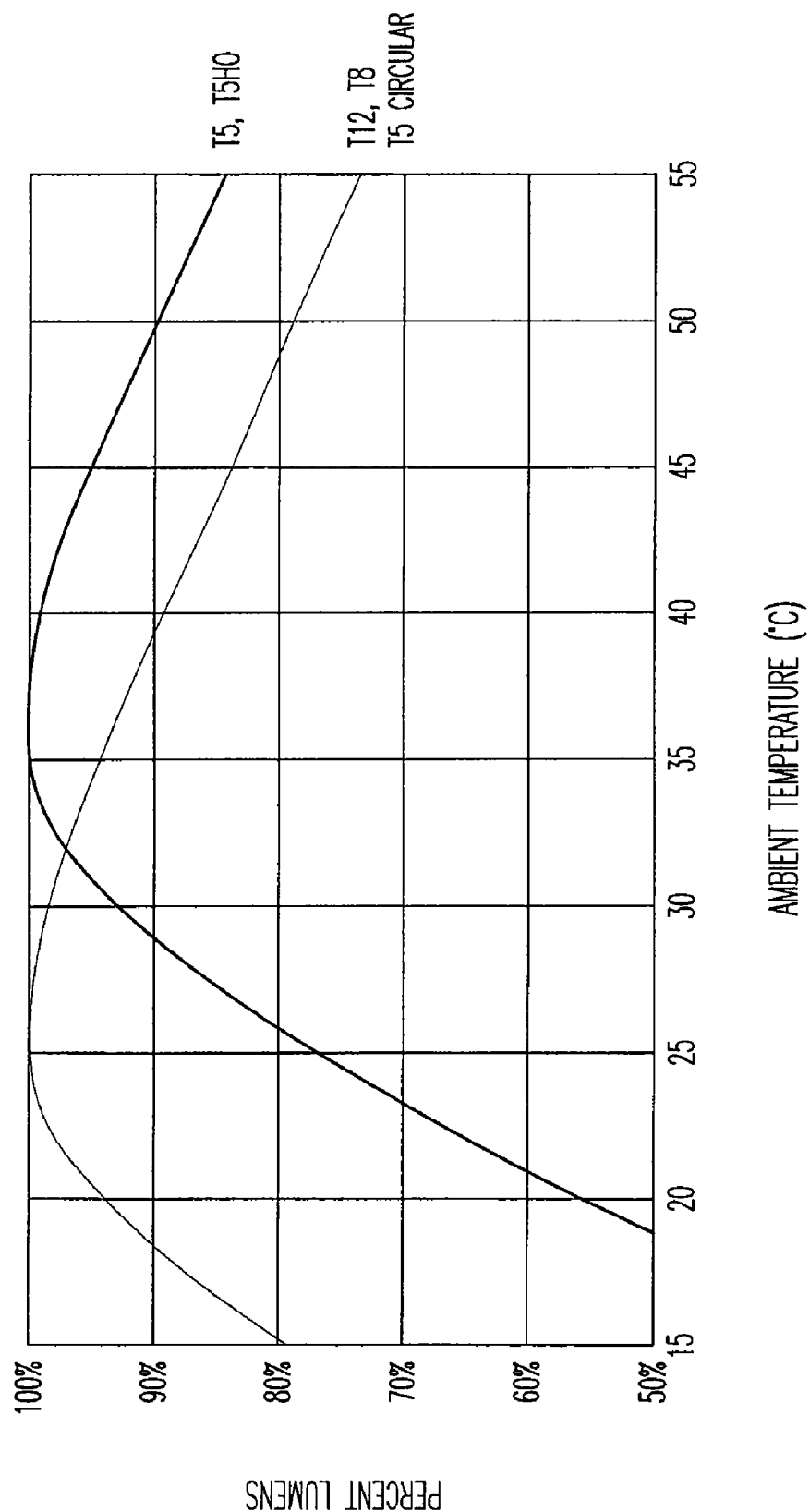
FIG. 9 is a graph showing one embodiment of the temperature versus light intensity relationship for a particular lamp as supplied by the lamp manufacturer.

FIG. 6 is an electrical schematic of one embodiment of a light fixture according to the present invention. In FIG. 6, a thermostat 64 is shown which includes a temperature sensor and switch which form a part of the electrical circuit of FIG. 6. The thermostat 64 is set to turn a switch on to activate the fans 70 when the temperature exceeds a first set point and the thermostat 64 is set turn the switch off to deactivate the fans 70 when the temperature is less than a second set point. The first set point and the second set point are associated with a temperature range based around the optimal point corresponding with the highest light intensity for the fluorescent lights 60. In the case of T5 compact fluorescent bulbs the optimal point is approximately 35° C. or within a range of approximately 34° C. to 36° C. FIG. 9. If the temperature of the ambient air surrounding the fluorescent bulbs drops below the optimal point or the optimal range, the fans will de-energize. Also ballasts 90 are required to energize the fluorescent lights 60 and may be electronic type.

Figure 7:
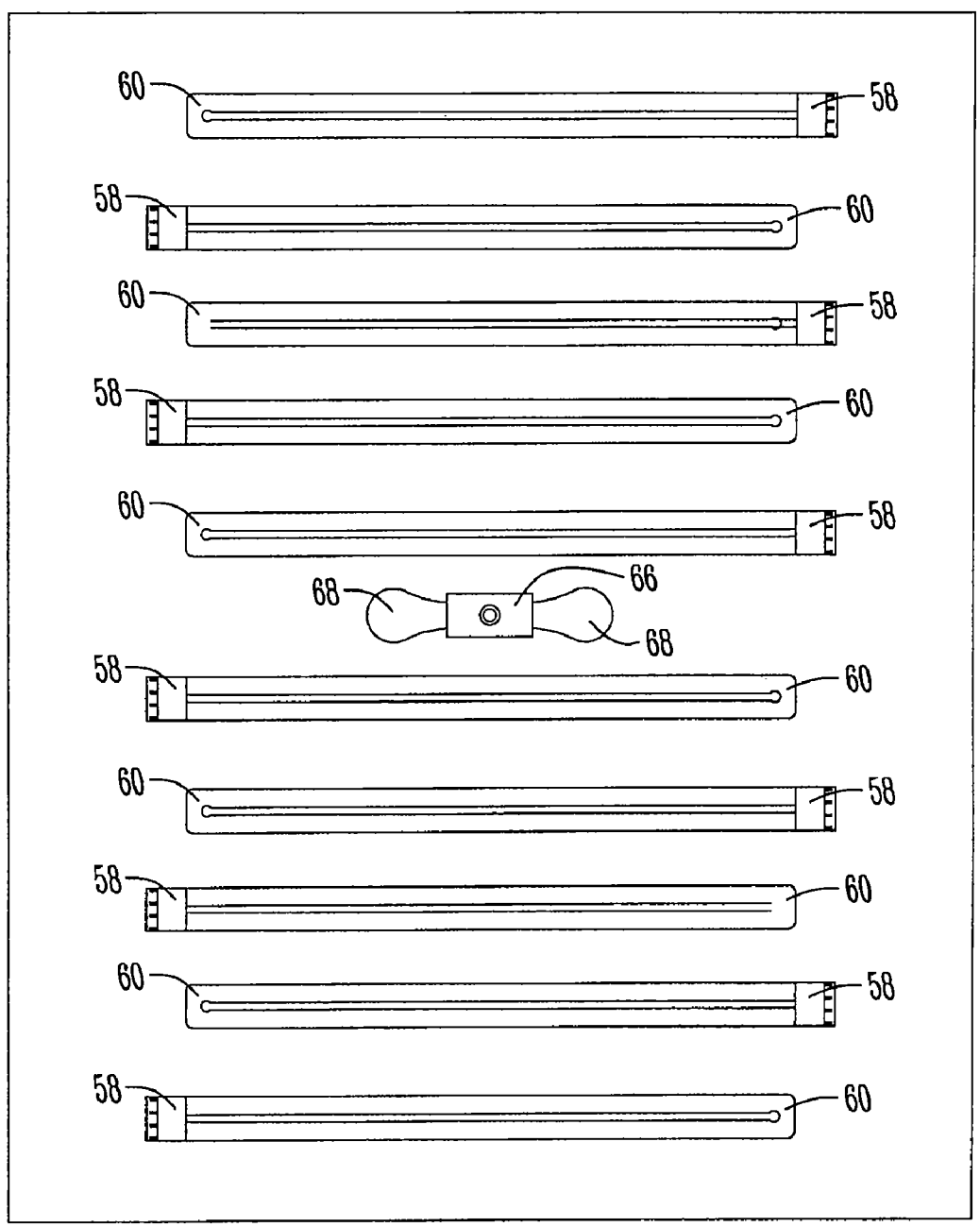
FIG. 7 is a view of one embodiment of a light fixture of the present invention.

FIG. 7 is another view of one embodiment of a lamp layout inside a light fixture according to one embodiment of the present invention.

Two plant growth chambers, one with the intensity maintaining light fixture and one with a conventional light fixture were compared. The plant growth chamber with the light fixture of the present invention is shown on the right. Note that the plant growth chamber on the right provides significant energy savings over the plant growth chamber on the left. The plant growth chamber on the right uses T5 lamps as opposed to T12 lamps as on the left which is a viable option because although the T5 lamps have varying light intensity based on temperature, the temperature of the T5 lamps is maintained to result in an optimum light intensity. One of the added advantages of a plant growth chamber having the light fixture of the present invention is that a smaller condensing unit can be used. Because there is less heat generated by the fluorescent lamps, there is less heat in the environmental chamber and the evaporator coils run warmer. Warmer evaporator coils are conducive to better overall chamber performance such as higher potential humidity levels, etc. Furthermore, because there is less heat to remove from the fluorescent lights, a smaller condensing unit can be used. Typically, the condensing unit is the component that consumes the most electrical power. Thus, the present invention provides for numerous advantages.

|  | PGC-10 MODEL 2006 | PGC-10 MODEL 2007 |
|---|---|---|
| LAMP TYPE | F48T12/CW/VHO | F54T5/841/HO |
| LAMP WATTAGE | 110 W | 54 W |
| DESIGN LUMENS PER LAMP | 4950 | 4750 |
| NUMBER OF LAMPS PER CHAMBER | 16 | 18 |
| TOTAL LUMENS PER CHAMBER | 79200 | 85500 |
| LIGHT OUTPUT @ 6" FROM LAMPS | 1000 µmoles/m$^2$/sec | 1075 µmoles/m$^2$/sec |
| HEAT GENERATED BY FLUOR. LAMPS | 5984 BTU/hr | 3304 BTU/hr |
| HEAT GENERATED BY INC. LAMPS | 680 BTU/hr or 100 W | 340 BTU/hr or 100 W |
| HEAT GENERATED BY ALL LAMPS | 6664 BTU/hr | 3644 BTU/hr |
| FLUORESCENTS KW CONSUMPTION | 2112 Watts | 1112 Watts |
| INCANDESCENS KW CONSUMPTION | 200 Watts | 100 Watts |
| LIGHTING KW CONSUMPTION | 2312 Watts | 1212 Watts |
| CONDENSING UNIT SIZE | 1½ HP | ¾ HP |
| CONDENSING UNIT MODEL | F3AH-A150-TFC | FTAH-A074-IAV |
| AMPERAGE DRAW W/LIGHTS ON | 15 | 9 |
| AMPERAGE DRAW W/LIGHTS OFF | 12 | 6 |
| KW CONSUMPTION W/LIGHTS ON | 5.4 | 3.4 |
| KW CONSUMPTION W/LIGHTS OFF | 4.2 | 2.2 |
| COST PER Kw/hr OF ELECTRICITY | $0.100 | $0.100 |
| DAILY CHAMBER OPERATING COST | $11.76 | $6.96 |
| YEARLY CHAMBER ELECTRICAL OPERATING $ | $4,292.40 | $2,540.40 |

Figure 8:
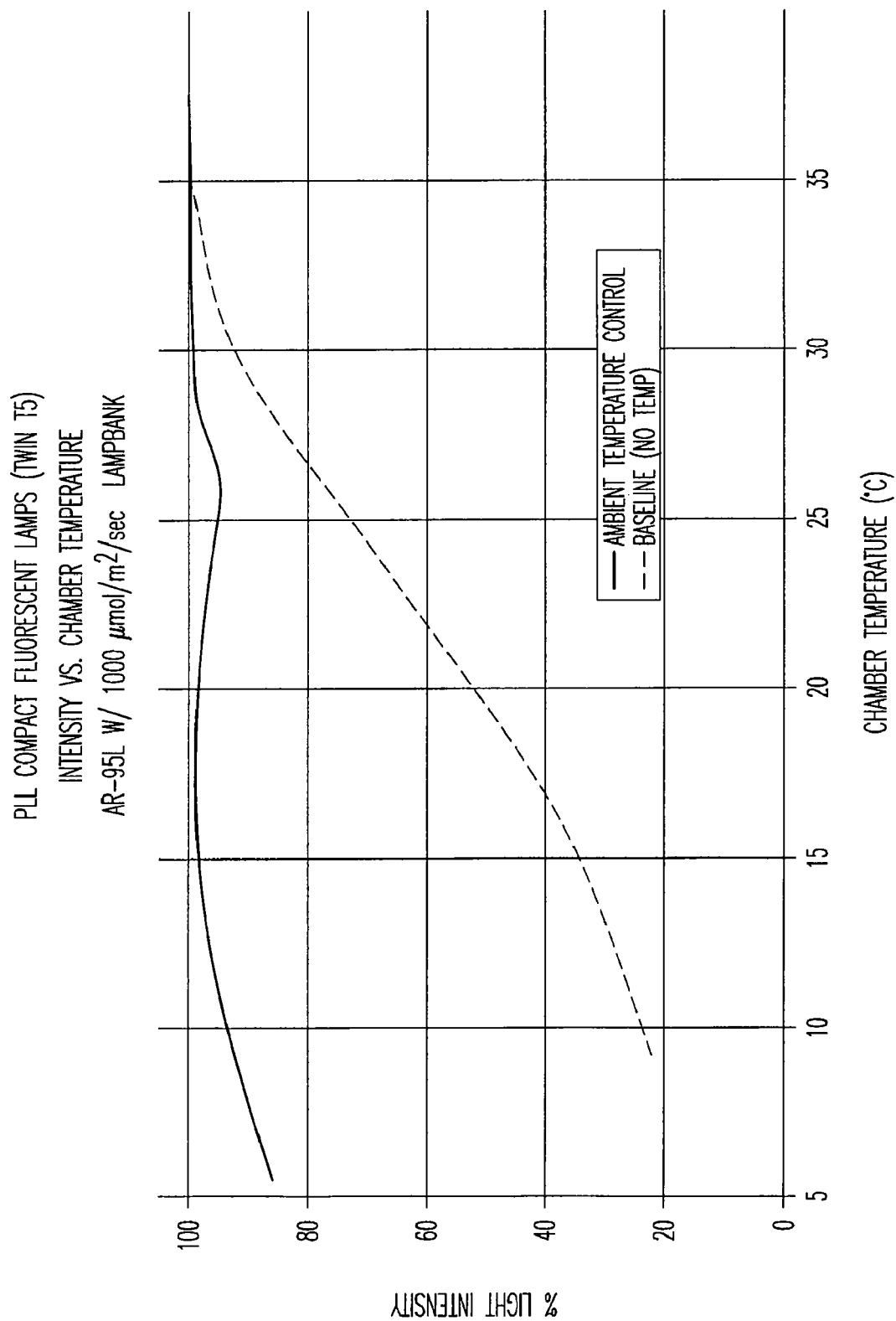
FIG. 8 is a graph showing the relationship between temperature of an environmental chamber and light intensity.

FIG. 8 provides a graph illustrating the effect of ambient temperature and light intensity. Data regarding the effect of ambient temperature on light intensity may also be obtained from manufacturers of fluorescent bulbs FIG. 9. It should further be appreciated that light intensity may be considered to be synonymous with light irradiance and light output. Light intensity, output, irradiance is measured in $\mu moles/m^2/sec$, Lumens, $Watts/m^2$, lux, foot candles, or $\mu einsteins/m^2/sec$.

Although the present invention has been described with respect to a preferred embodiment, the present invention contemplates numerous variations, options, and alternatives. For example, although one or more fans and a thermostat may be used as the thermal management system as shown in FIG. 6, the thermal management system may otherwise be implemented. If, for example, an environmental chamber is likely to be used at cool temperatures, then in addition to a fan a heater may be used to provide additional heat to the fluorescent bulbs such that they maintain optimum light intensity. In operation, the heater may turn on in advance of the fluorescent bulbs so that the temperature is such that optimum light intensity may be achieved when the fluorescent bulbs turn on. Other types of thermal management may also be performed including liquid heating or cooling instead of air heating or cooling. Where fans are used, the present invention contemplates that instead of turning fans on and off, a variable speed fan can be used to assist in maintaining conditions for optimum light intensity.

By way of another example, instead of using a temperature sensor or thermostat, light intensity may be measured with a photometer. Where light intensity is less than optimum, then temperature may be increased or decreased accordingly. Another example of a physical parameter that may be measured to provide insight into light intensity or temperature is the current draw of the fluorescent bulbs over time.

It should also be appreciated that where a temperature sensor is used, the temperature sensor need not be proximate the fluorescent bulbs if light intensity can otherwise be inferred. For example, the temperature within the environmental chamber may be related to the light intensity.

Figure 10:
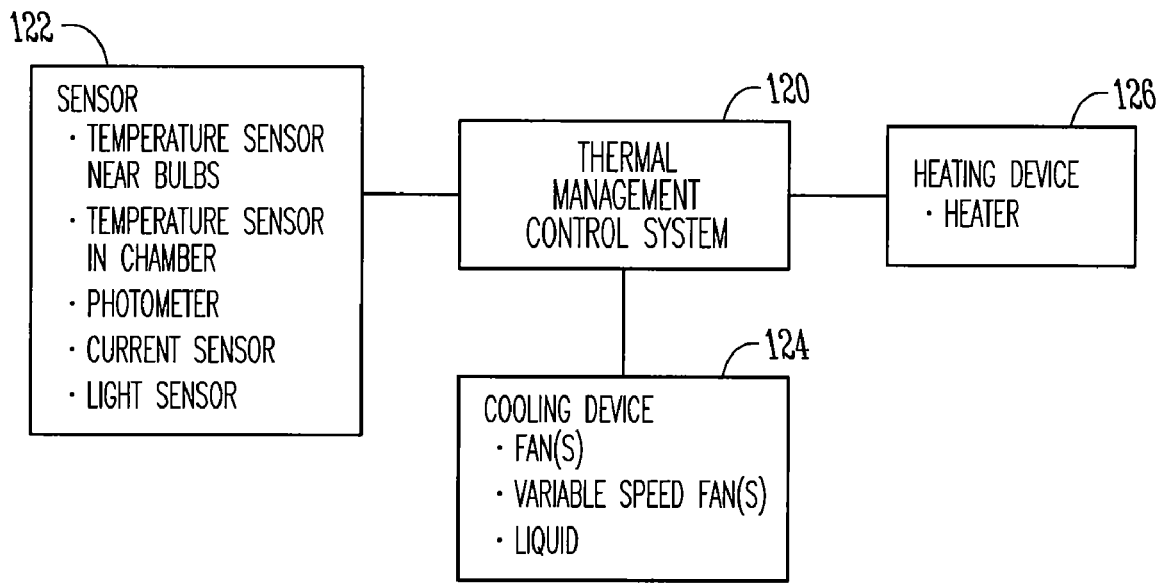
FIG. 10 is a block diagram of another embodiment of the present invention.

FIG. 10 illustrates a block diagram of another embodiment of the present invention. In FIG. 10, a thermal management control system 120 is shown. A sensor 122 is electrically connected to the thermal management control system 120. The sensor 122 may be a temperature sensor near fluorescent bulbs, or a temperature within an environmental chamber. The sensor 122 may also be a photometer, a current sensor or other type of sensor. One or more cooling devices 124 are operatively connected to the thermal management control system 120. The cooling device 124 may include one or more fans, one or more variable speed fans, or provide for liquid cooling. A heating device 126 may also be operatively connected to the thermal management control system 120. The heating device 126 may include a heater.

It should be appreciated that more than one sensor may be used at a time. For example, both a temperature sensor and a light sensor may be used together. A determination of whether the light fixture is operating in an optimum range can be made with a light sensor. Then a temperature sensor can indicate whether heat should be added or removed to stay in or return to the optimum range. Where a light sensor is used, it may be placed approximately six inches from the light fixture barrier, pointing towards the fluorescent bulbs.

A relationship between current draw and light intensity may be inferred. Where such a relationship is known, measuring current draw, such as with a current sensor, may be used to assist in determining light intensity.

The present invention is not to be limited to the specific embodiments described herein but also other variations, options, and alternatives within the spirit and scope of the invention.

What is claimed is:

1. A light fixture for use in an environmental chamber and separated from compartments within the environmental chamber by a thermal barrier, the light fixture comprising:
   a plurality of fluorescent bulbs wherein a light intensity of each of the plurality of fluorescent bulbs is related to operating temperature of the fluorescent bulbs;
   a sensor for sensing temperature of the fluorescent bulbs independent from temperature within the compartments of the environmental chamber;
   a circuit adapted for monitoring the sensor and controlling the operating temperature of the fluorescent bulbs to maintain the operating temperature of the fluorescent bulbs within a range having a lower temperature and an upper temperature.

2. The light fixture of claim 1 wherein the circuit includes a thermostat switch.

3. The light fixture of claim 1 wherein the fluorescent bulbs are T5 bulbs.

4. The light fixture of claim 1 further comprising at least one fan electrically connected to the circuit and wherein controlling the operating temperature of the fluorescent bulbs is performed by controlling operation of the at least one fan.

5. A light fixture for use in an environmental chamber, comprising:
   a plurality of fluorescent bulbs separated from one or more compartments within the environmental chamber by a thermal barrier;
   a temperature sensor positioned proximate the plurality of fluorescent bulbs;
   at least one fan for cooling the plurality of fluorescent bulbs;
   an electrical circuit connected to the temperature sensor and the at least one fan, wherein the electrical circuit is adapted to maximize light intensity of the fluorescent bulbs within a predetermined range of ambient temperatures by controlling the at least one fan to control temperature of the fluorescent bulbs and to thereby increase temperature of the plurality of fluorescent bulbs if the temperate of the fluorescent bulbs is below the predetermined range and to decrease the temperature of the fluorescent bulbs if the temperature is above the predetermined range.

6. The light fixture of claim 5 wherein the temperature sensor is a thermostat.

7. The light fixture of claim 5 wherein each of the plurality of fluorescent bulbs are T5 bulbs.

8. The light fixture of claim 7 wherein the T5 bulbs are twin T5 bulbs.

9. The light fixture of claim 7 wherein the T5 bulbs are linear T5 bulbs.

10. An improvement to an environmental chamber having an insulated cabinet, a refrigeration system adapted for controlling the temperature within the insulated cabinet, a control system, the improvement comprising:
   one or more light fixtures disposed within the insulated cabinet;
   a thermal barrier separating the one or more light fixtures from compartments within the insulated cabinet;
   wherein each of the one or more the light fixture comprises (a) a plurality of fluorescent bulbs; (b) a sensor; and (c) a thermal management control system electrically connected to the sensor and adapted to provide for heating and cooling of the plurality of fluorescent bulbs to maintain optimum light intensity of the fluorescent bulbs.

11. The environmental chamber of claim 10 wherein the plurality of fluorescent bulbs are T5 bulbs.

12. The environmental chamber of claim 10 wherein the plurality of fluorescent bulbs are T5 twin bulbs.

13. The environmental chamber of claim 10 wherein the plurality of fluorescent bulbs are T5 linear bulbs.

14. The environmental chamber of claim 10 wherein the sensor is a temperature sensor positioned proximate the plurality of fluorescent bulbs.

15. The environmental chamber of claim 10 wherein the thermal management control system comprises at least one fan for cooling the plurality of fluorescent bulbs and wherein operation of the fluorescent bulbs provides for self-heating of the fluorescent bulbs.

16. The environmental chamber of claim 10 wherein the sensor is a light sensor.

17. A method of maintaining light intensity of fluorescent bulbs in an environmental chamber wherein the fluorescent bulbs are separated from one or more compartments of the environmental chamber by a thermal barrier, the method comprising:
monitoring a physical parameter associated with the light intensity of the fluorescent bulbs in the environmental chamber;
adjusting temperature of the fluorescent bulbs in the environmental chamber independently from temperature in the one or more compartments of the environmental chamber based on the physical parameter to maintain an optimum light intensity of the fluorescent bulbs in the environmental chamber.

18. The method of claim 17 wherein the bulbs are T5 bulbs.

19. The method of claim 17 wherein the plurality of fluorescent bulbs are T5 twin bulbs.

20. The method of claim 17 wherein the plurality of fluorescent bulbs are T5 linear bulbs.

21. The method of claim 17 wherein the step of adjusting temperature of the fluorescent bulbs is performed by controlling at least one fan.

22. The method of claim 17 wherein the physical parameter is temperature.

23. The method of claim 22 wherein the temperature is a temperature proximate the fluorescent bulbs.

24. The method of claim 22 wherein the temperature is within the environmental chamber.

25. A method of maintaining light intensity of fluorescent bulbs in an environmental chamber, comprising:
providing an environmental chamber, comprising an insulated cabinet, a refrigeration system adapted for controlling the temperature within the insulated cabinet, a control system, one or more light fixtures disposed within the insulated cabinet, a thermal barrier separating the one or more light fixtures from compartments within the insulated cabinet; and wherein each light fixture comprises (a) a plurality of fluorescent bulbs; (b) a sensor; and (c) a thermal management control system electrically connected to the sensor and adapted to provide for heating and cooling of the plurality of fluorescent bulbs to maintain optimum light intensity of the fluorescent bulbs;
monitoring a physical parameter associated with the light intensity of the fluorescent bulbs using the sensor;
adjusting temperature of the fluorescent bulbs independently from temperature in the one or more compartments of the environmental chamber based on the physical parameter to maintain an optimum light intensity of the fluorescent bulbs in the environmental chamber.

26. The method of claim 25 wherein the bulbs are T5 bulbs.

27. The method of claim 25 wherein the plurality of fluorescent bulbs are T5 twin bulbs.

28. The method of claim 25 wherein the plurality of fluorescent bulbs are T5 linear bulbs.

29. The method of claim 25 wherein the physical parameter is temperature of the bulbs.

30. The method of claim 25 wherein the thermal management control system includes at least one fan and wherein the step of adjusting temperature of the fluorescent bulbs is performed by controlling at least one fan.

31. The method of claim 25 wherein the physical parameter is temperature within the environmental chamber.

* * * * *

UNITED STATES PATENT AND TRADEMARK OFFICE
CERTIFICATE OF CORRECTION

PATENT NO. : 7,794,105 B2
APPLICATION NO. : 11/621412
DATED : September 14, 2010
INVENTOR(S) : Imberti et al.

It is certified that error appears in the above-identified patent and that said Letters Patent is hereby corrected as shown below:

Column 8, Claim 5, line 44
DELETE: "temperate"
ADD: --temperature--

Column 8, Claim 10, line 64
DELETE: "the light fixture"
ADD: --light fixtures--

Signed and Sealed this

Ninth Day of November, 2010

David J. Kappos
*Director of the United States Patent and Trademark Office*